United States Patent [19]
Schmidt et al.

[11] Patent Number: 5,209,832
[45] Date of Patent: May 11, 1993

[54] PROCESS FOR THE PREPARATION OF METAL COMPLEX DYES

[75] Inventors: Wilhelm Schmidt, Lörrach; Gerhard Beck, Rheinfelden, both of Fed. Rep. of Germany

[73] Assignee: Ciba-Geigy Corporation, Ardsley, N.Y.

[21] Appl. No.: 805,428

[22] Filed: Dec. 11, 1991

[30] Foreign Application Priority Data

Dec. 18, 1990 [CH] Switzerland .......................... 4011/90

[51] Int. Cl.$^5$ ............................................. G01N 27/26
[52] U.S. Cl. ...................................... 204/434; 204/405; 204/153.1
[58] Field of Search ...................... 204/434, 405, 153.1

[56] References Cited

FOREIGN PATENT DOCUMENTS 1085262 1/1955 France .

OTHER PUBLICATIONS

Z. Anal. Chem. 260, pp. 261–267.
Z. Anal. Chem. 186, pp. 187–193.
Z. Anal. Chem. 238, pp. 321–414.
"Polarography and voltammetry of dyes and intermediates", *Trends in Analytical Chemistry* 5:4 pp. 97–102 (1986) P. M. Berger et al.
Chem. Abstract 86 (2) 6375y.
Chem. Abstract 105 (14) 116519s.
Chem. Abstract 112 (4) 29964j.
Z. Anal. Chem. 269, pp. 344–349.
Z. Anal. Chem. 245, pp. 58–61.
Chimia 28, No. 2, pp. 56–59.

*Primary Examiner*—John Niebling
*Assistant Examiner*—Bruce F. Bell
*Attorney, Agent, or Firm*—Marla J. Mathias; Edward McC. Roberts

[57] ABSTRACT

The invention relates to a process for the preparation of a metal complex dye under production conditions, which comprises reacting at least one dye with a metal donor, adding said metal donor or said dye discontinuously before the end point of the metallizing is reached, and determining the end of the metallizing voltametrically.

The process makes it possible to prepare metal complex dyes in good yield and purity.

13 Claims, 1 Drawing Sheet

PROCESS FOR THE PREPARATION OF METAL COMPLEX DYES

The present invention relates to a novel process for the preparation of metal complex dyes under production conditions, wherein the end point of the metallising is determined by means of a voltametric method.

In recent years, increasing endeavours have been made to automate and optimise processes for the preparation of metal complex dyes. To obtain satisfactory and reproducible results it is necessary to rely on methods which are characterised by the following criteria: as quantitative yields as possible, reproducibly good quality, a great number of reactions per unit of time, low wastewater pollution, operability under production conditions and ease of automation. In addition, irrespective of the quality of the starting materials, constant quality of the process products in optimum yield is required at the present time.

The standard procedure for the preparation of metal complex dyes has heretofore been that the dye is reacted with the metal salt in the amount theoretically required for a stoichiometric reaction. The drawback of this procedure is that the actual end point of the metallising is not accurately observed and also that there is an excess of dye or metal salt because of secondary reactions. Disadvantages regarding the quality of the product and wastewater pollution are thus linked together.

Accordingly, it is the object of this invention to provide a process which meets the aforementioned requirements and, in particular, can be used under production conditions, and which is suitable for carrying out the reaction by an automated process. It has been found that the process described in this specification meets these requirements.

Specifically, the invention relates to a process for the preparation of metal complex dyes under production conditions, which comprises reacting at least one dye with a metal donor, adding said metal donor or said dye discontinuously before the end point of the metallising is reached, and determining the end of the metallising voltametrically.

Throughout this specification, the expression "under production conditions" shall be understood as meaning those conditions under which the reaction of the dye with the metal donor is carried out in concentrated solutions or suspensions. Preferred concentrated solutions are those which are in the form of suspensions at room temperature. The solutions or suspensions are preferably aqueous.

Voltametric processes are known per se (q.v. for example G. Kraft, Z. Anal. Chem., Vol. 238 (1968), pages 321 to 414). Known voltametric processes are described as analytical methods, wherein a metal salt is titrated with a complex former and the course of the titration is followed by a voltametric method. The end point of the titration is normally determined from the point of inflection of the potential curve obtained. Known analytical methods are carried out in dilute solutions which are free from impurities. In addition, the solution to be titrated can be adapted in optimum manner to the analytical method (e.g. with respect to pH, temperature, auxiliaries such as conducting salts) in order to facilitate or make possible the evaluation of the potential curve.

In contradistinction to analytical methods, however, the object under production conditions is to achieve as high a space-time yield as possible so that the process is carried out using concentrated solutions or suspensions. These usually additionally contain impurities. Process parameters such as temperature and pH are substantially governed by the production conditions, and the addition of further auxiliaries which enhance the evaluation of the potential curves can affect the quality of the process products. Under these conditions, voltametric analysis cannot readily be applied.

SUMMARY OF THE INVENTION

The invention relates to a process for the preparation of a metal complex dye under production conditions, which comprises reacting at least one dye with a meatl donor, adding said metal donor or said dye discontinuously before the end point of the metallizing voltametrically.

The process makes it possible to prepare metal complex dyes in good yield and purity.

DETAILED DESCRIPTION OF THE INVENTION

Figure 1:
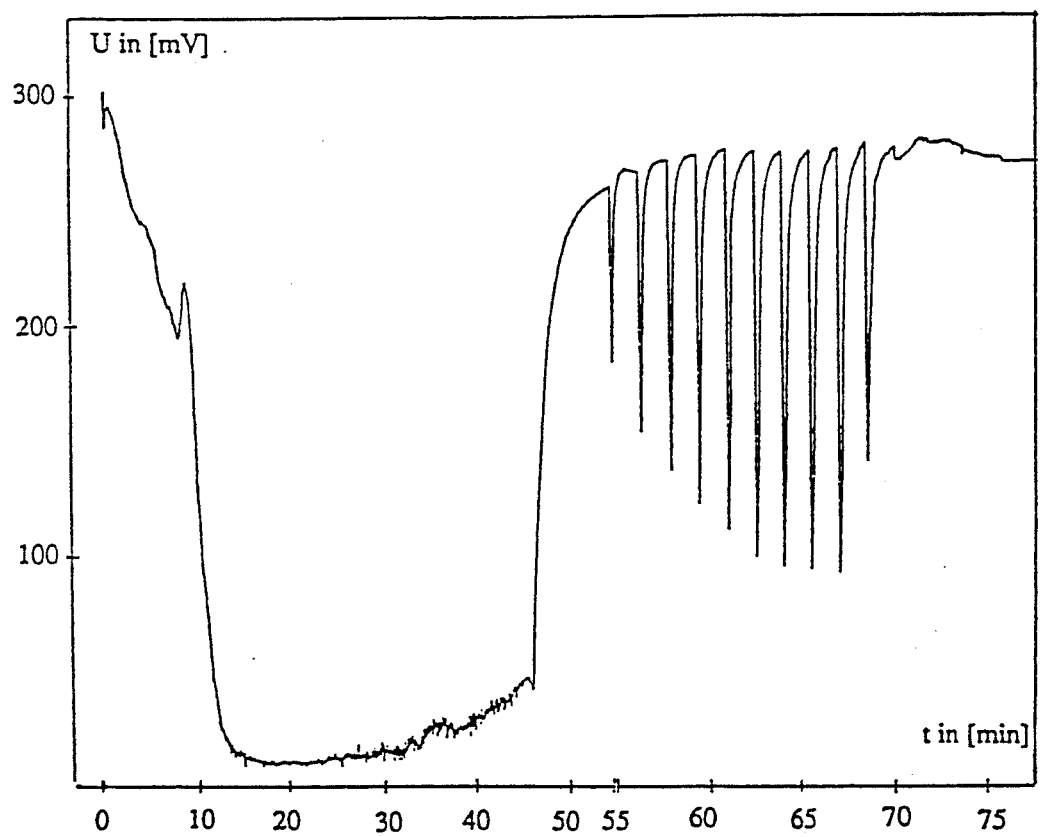
FIG. 1 is a graph of potential versus time.

It is surprising that the process of this invention for the preparation of metal complex dyes under production conditions makes it possible to determine the end point of the metallising so that no unnecessary excess of dye or metal salt occurs.

The metallising is normally carried out in the temperature range from 0° to 160° C., preferably from 20° to 100° C., and the reaction is carried out at a temperature above 100° C. in a closed vessel under a pressure (overpressure) of typically 1 to 6 bar. The dyes used in the process of this invention contain metallisable groups, such as amino, hydroxyl and/or carboxyl groups.

Suitable metallisable dyes are, in addition to dyes containing water-solubilising groups, also disperse dyes, solvent dyes as well as pigments, for example the compounds containing metallisable groups listed in the Colour Index, Third Edition, Vols. 3 and 4 (1971) under Disperse Dyes, Solvent Dyes and Pigments.

The dyes used in the process of this invention are single dyes or mixtures of different dyes. Illustrative examples of such dyes are metallisable monoazo, disazo or polyazo dyes, azomethines, azaannulenes, such as phthalocyanines or porphines, formazanes, anthraquinones, phenols, anilines, dithiocarbamates, dithiols as well as heterocyclic compounds such as 2,2'-bipyridines, isoindolinones, pyrroles and pyridines. It is preferred to use monoazo, diazo or polyazo dyes or azomethines. It is especially preferred to use monoazo, disazo or polyazo dyes, most preferably monoazo dyes. Suitable diazo components are typically those of the benzene, naphthalene or heterocyclic series. Suitable coupling components are typically those of the benzene, naphthalene or heterocyclic series or acetoacetanilide. Exemplary of heterocyclic coupling components are pyrazolone or pyridine.

The dyes used in the process of this invention can contain the customary substituents of dyes in addition to the metallisable groups.

Illustrative examples of such substituents are: $C_1$-$C_8$alkyl, $C_1$-$C_8$alkoxy, $C_2$-$C_6$alkanoyl, $C_2$-$C_6$alkanoylamino, $C_1$-$C_6$alkoxycarbonyl, $C_1$-$C_6$alkoxycarbonylamino, benzoylamino, amino, hydroxy, halogen, sulfo, nitro, carboxy, cyano, phenyl, sulfamoyl, N—C-

$C_1$–$C_4$alkylaminosulfonyl, phenylsulfonyl, benzylsulfonyl, phenylaminosulfonyl or $C_1$–$C_8$alkylsulfonyl, which substituents may be further substituted in the alkyl moiety or in the phenyl ring by one or more of the above indicated substituents.

Preferred metal donors are copper, cobalt or nickel donors, more particularly cobalt donors. The customary salts or metal complexes of these metals may suitably be used, typically copper(II) acetate, copper(II) sulfate, cobalt(II) sulfate, cobalt(II) acetate, freshly precipitated cobalt(II) hydroxide, nickel sulfate, nickel chloride; as well as complex metal compounds, aliphatic dicarboxylic acids, hydroxycarboxylic acids or aromatic hydroxycarboxylic acids such as cobalt tartrate.

In a preferred embodiment of the process of this invention the dye is charged to the reactor and the metal donor is added thereto.

It is further preferred to carry out the reaction of the dye with the metal donor to give the metal complex dye continuously after the synthesis of the dye, without isolating the dye from the reaction mixture. In this process variant, the dye is prepared initially and the reaction mixture, without isolation of the dye, is reacted direct with the metal donor.

A further preferred embodiment of the process of this invention comprises carrying out the reaction of the dye with the metal donor in the presence of an oxidising agent (e.g. hydrogen peroxide or a nitro compound such as 3-nitrobenzenesulfonic acid). It has been found useful in this case to blow air into the reaction mixture. In this embodiment of the inventive process it is preferred to use a copper, cobalt or nickel donor, more particularly a cobalt donor.

The inventive process can be carried out with polarisible electrodes (e.g. platinum or gold-plated platinum electrodes) in conjunction with a reference electrode, typically a calomel electrode, or with two polarisable electrodes without a reference electrode. The use of two polarisable electrodes without reference electrode is preferred, especially double-ring electrodes, preferably platinum double-ring electrodes or gold-plated platinum double-ring electrodes. The polarisation currents are preferably in the range from 0.2 to 10 $\mu A$.

A further preferred embodiment of the inventive process comprises controlling the addition of the dye or metal donor by means of a voltametrically determined value. The reaction of the dye with the metal donor is preferably carried out by an automated process in which the addition of the dye or of the metal donor is controlled by a voltametrically determined value.

The potential jumps which occur during the discontinuous addition of the dye or metal donor act as a measured variable which can be used for controlling the addition of the dye or metal donor. In discontinuous, i.e. incremental, addition, each addition effects a sudden rise or drop in the potential which stabilises again over a short period of time within the range of the original value. With continual incremental addition of the dye or metal donor, the potential jumps which occur have a decreasing recoil tendency or they become less pronounced. The height and/or the recoil of the potential provides information on the degree of conversion. If no further substantial change in the potential is observed, or if the slope of the recoil of the potential is minimal, then the addition is complete. The procedure for example will therefore be that initially the dye or the metal donor is added continuously and then added discontinuously. Discontinuous addition for example is commenced after addition of about 70-90% by weight of the theoretical amount of dye required for stoichiometric reaction or of the theoretically required amount of metal donor. The duration of the individual interruptions of addition is normally from 0.1 to 15 minutes. Evaluation of the height and/or recoil tendency of the potential jumps, for example by the process computer, makes it possible to determine the end point of the metallising and to terminate the addition. For dyes, the limiting values of the height or recoil of the potential jumps can be so fixed that an almost complete reaction is achieved and there is virtually no excess of metal salt or dye.

It is preferred to add the dye or the metal donor continuously at the start of the reaction and then to make the addition discontinuously.

A particularly preferred embodiment of the inventive process comprises adding the metal donor to the dye which is present in the reactor, using as electrodes two polarisable electrodes without reference electrode.

A particularly preferred embodiment of the inventive process comprises carrying out the reaction of the dye with the metal donor to give the metal complex dye continuously after the synthesis of the dye, without isolating the dye from the reaction mixture, adding the metal donor and charging the dye to the reactor, using as electrodes two polarisable electrodes without reference electrode.

The invention is illustrated by the following Examples in which parts and percentages are by weight and the relationship between parts by weight and parts by volume is the same as that between the gram and the cubic centimeter.

EXAMPLE 1

An aqueous suspension containing 8% of the dye of formula

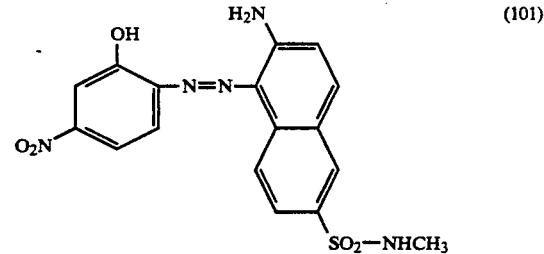

(101)

is prepared by diazotising 2-amino-5-nitrophenol and coupling the diazonium salt to 2-naphthylamine-6-sulfomethylamide in conventional manner. The diazotisation is carried out with aqueous sodium nitrite solution at room temperature and pH 0. Excess nitrite solution is destroyed with sulfamic acid. Coupling is carried out in the diazo suspension in the temperature range from 40°–60° C. and at pH 1.5.

100 parts of the resultant suspension which contains 8 parts of the dye of formula (101) are adjusted to pH 12 with sodium hydroxide solution and heated to a temperature of 60° C. With constant stirring, 16.91 parts of a previously prepared aqueous solution of cobalt sulfate/tartaric acid (prepared by dissolving 8.2 parts of cobalt sulfate, 8.4 parts of tartaric acid and 11 parts of a 50% aqueous solution of sodium hydroxide in 72.4 parts of water) are added continuously over 45 minutes. After a 10 minute wait for the potential to stabilise, the cobalt sulfate/tartaric acid solution is added in increments of 0.094 part at 1.5 minute intervals, while stirring the reaction mixture constantly.

During the addition of the cobalt sulfate/tartaric acid solution, the potential of the reaction mixture is measured constantly with a platinum double-ring electrode, while applying a constant current of 5 μA between the platinum rings.

During the incremental addition of the cobalt sulfate/tartaric acid solution, each addition effects a jump in the potential, which rapidly stabilises again. After 70 minutes and the addition of a total amount of 17.94 parts of the cobalt sulfate/tartaric acid solution, no further substantial change in the potential is observed and the addition is complete (q.v. FIG. 1, where the course of the potential is plotted in millivolts against the time of the addition in minutes).

Analysis of a sample of the reaction mixture by thin-layer chromatography shows that no more dye of formula (101) is obtained. Cobalt detection with sulfide shows only traces.

The reaction mixture is cooled to room temperature, then filtered and dried, to give a metal complex dye which corresponds to the compound of formula

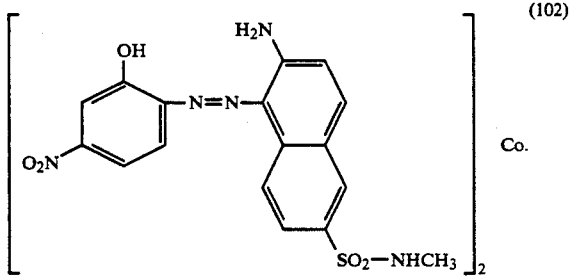

EXAMPLE 2

A mixture of 408 parts of the dye of formula

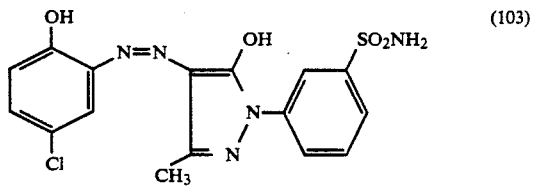

and 13 000 parts of water is adjusted to pH 11 with an aqueous solution of sodium hydroxide (36%) and the mixture is heated to a temperature of 80° C. Then 590 parts of a previously prepared aqueous solution of cobalt sulfate/tartaric acid (prepared by dissolving 80 parts of cobalt sulfate and 75 parts of tartaric acid in 500 parts of water) are added continuously to the above mixture over 30 minutes. After waiting for the volumetric potential to stabilise, the cobalt sulfate/tartaric acid solution is added in increments of 6 parts at about 10 minute intervals. During the addition of the cobalt sulfate/tartaric acid solution, the potential of the reaction mixture is measured constantly with a platinum double-ring electrode, while applying a constant current of 5 μA between the platinum rings. The addition of the cobalt sulfate/tartaric acid solution is complete when the addition of the solution is observed to effect almost no further change in the potential.

The reaction mixture is cooled with ice to 50° C. The 1:2 cobalt complex dye is isolated by filtration after addition of sodium chloride and adjusting the pH to 8.

EXAMPLE 3

A mixture of 1097 parts of a dye which, in the form of the free acid, corresponds to the compound of formula

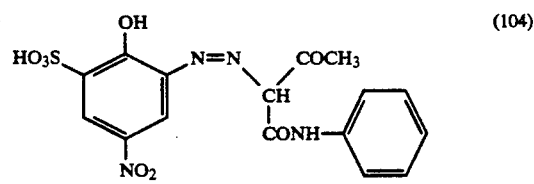

and 12 000 parts of water is heated to a temperature of 70° C. and the pH is adjusted to 8 with an aqueous solution of sodium hydroxide (36%). Then 2000 parts of a previously prepared aqueous solution of cobalt sulfate/tartaric acid (prepared by dissolving 200 parts of cobalt sulfate and 200 parts of tartaric acid in 2000 parts of water and subsequently adjusting the pH to 11.4 with an aqueous solution of sodium hydroxide (36%)) are added continuously to the suspension over 60 minutes. During the addition of the cobalt sulfate/tartaric acid solution air is blown into the reaction mixture, and the potential of the reaction mixture is measured constantly with a platinum double-ring electrode, while applying a constant current of 5 μA between the platinum rings. Then the aqueous cobalt sulfate/tartaric acid solution is added in increments of 20 parts at about 5 minute intervals. The addition of the cobalt sulfate/tartaric acid solution is complete when the change in the potential caused by the addition of the cobalt sulfate/tartaric acid solution markedly decreases.

The 1:2 cobalt dye is isolated by filtration after addition of sodium chloride and adjusting the pH to 7–8.

EXAMPLE 4

A mixture of 335 parts of the dye of formula

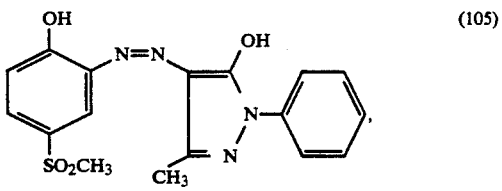

439 parts of the dye of formula

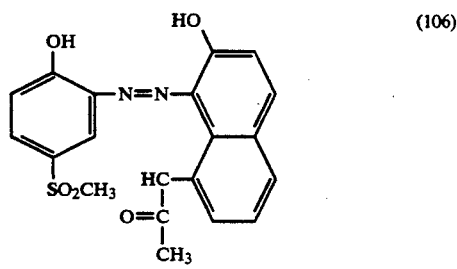

and 22 000 parts of water is heated to a temperature of 45° C. and adjusted to pH 9 with an aqueous solution of sodium hydroxide (36%). Then 1500 parts of a previously prepared aqueous solution of cobalt sulfate/tartaric acid (prepared by dissolving 155 parts of cobalt sulfate and 150 parts of tartaric acid in 1500 parts of water and subsequently adjusting the pH to 11.5 with an aqueous solution of sodium hydroxide (36%)) are added continuously to the mixture over 45 minutes. During the addition of the cobalt sulfate/tartaric acid solution, the pH of the reaction mixture is kept at 9 and the potential of the reaction mixture is measured constantly with a platinum double-ring electrode, while applying a constant current of 5 μA between the platinum rings. After a 60 minute wait, the aqueous cobalt sulfate/tartaric acid solution is added in increments of 15 parts at about 10 minute intervals. The addition is complete when addition of the solution is observed to effect no further change in the potential.

The reaction product is isolated by filtration after addition of sodium chloride, giving a mixture of the symmetric 1:2 cobalt complex dye of the compounds of formulae (104) and (105) and the corresponding asymmetric 1:2 cobalt complex dye.

EXAMPLE 5

A mixture of 790 parts of the dye of formula

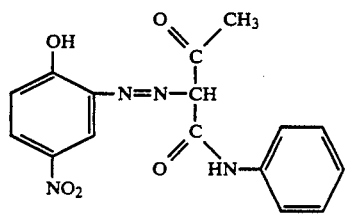

(107)

and 20 000 parts of water is heated to a temperature of 85° C. and the pH is adjusted to 11.5 with an aqueous solution of sodium hydroxide (36%). Then 1900 parts of a previously prepared aqueous solution of cobalt sulfate/tartaric acid (prepared by dissolving 180 parts of cobalt sulfate and 170 parts of tartaric acid in 2000 parts of water and subsequently adjusting the pH to 11.5 with an aqueous solution of sodium hydroxide (36%) are added continuously to the mixture over 45 minutes. During the addition of the cobalt sulfate/tartaric acid solution air is blown into the reaction mixture, and the potential of the reaction mixture is measured constantly with a platinum double-ring electrode, while applying a constant current of 5 μA between the platinum rings. After 30 minutes the aqueous cobalt sulfate/tartaric acid solution is added in increments of 20 parts at 5 minute intervals. The addition is complete when there is no further change in the potential caused by the addition of the cobalt sulfate/tartaric acid solution.

The 1:2 cobalt complex is isolated by filtration after addition of sodium chloride and adjusting the pH to 5.

EXAMPLE 6

An aqueous suspension which contains 5.2% of the dye of formula

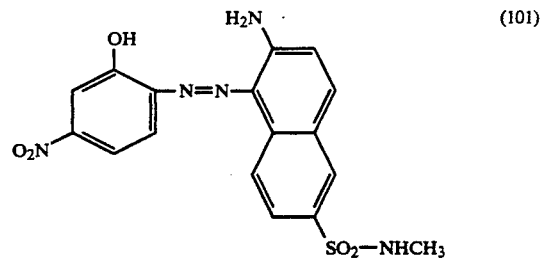

(101)

is prepared by diazotising 2-amino-5-nitrophenol and coupling the diazonium salt to 2-naphthylamine-6-sulfomethylamide in conventional manner. The diazotisation is carried out with aqueous sodium nitrite solution at room temperature and pH 0. Excess nitrite solution is destroyed with sulfamic acid. Coupling is carried out in the diazo suspension in the temperature range from 40°-60° C. and at pH 1.5.

15 000 parts of the resultant suspension which contains 780 parts of the dye of formula (101) are adjusted to pH 12 with an aqueous solution of sodium hydroxide (36%). Then 5000 parts of a previously prepared aqueous solution of copper sulfate/ammonia (prepared by dissolving 320 parts of copper sulfate and 480 parts of concentrated ammonia in 5000 parts of water) are added continuously to the suspension over 45 minutes, while keeping the pH at 12 by addition of an aqueous solution of sodium hydroxide (36%). During the addition of the copper sulfate/ammonia solution, the potential of the reaction mixture is measured constantly with a platinum double-ring electrode while applying a constant current of 5 μA between the platinum rings. Then the aqueous copper sulfate/ammonia solution is added in increments of 50 parts at 5 minute intervals. The addition is complete when, after changes in the potential, virtually no recoil of the potential is observed.

The 1:1 copper complex dye is isolated by filtration after addition of sodium chloride.

EXAMPLE 7

An aqueous suspension which contains 6.25% of a dye which, in the form of the free acid, corresponds to the compound of formula

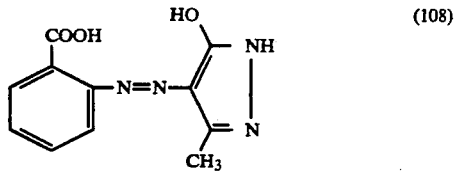

(108)

is prepared by diazotising of 2-aminobenzoic acid and coupling the diazonium salt to 3-methyl-5-pyrazole in conventional manner. Diazotisation is carried out with aqueous sodium nitrite solution at 0°-5° C. and at pH 1. Excess nitrite solution is destroyed with sulfamic acid. Coupling is carried out in the diazo suspension at 0°-20° C. and pH 8.0-8.5. Then 144 parts of a previously prepared aqueous solution of nickel chloride (prepared by dissolving 68 parts of nickel chloride in 112 parts of water) are added continuously over 60 minutes to 1200 parts of the suspension so obtained, while keeping the pH at 6-7 by addition of an aqueous solution of sodium hydroxide (36%). The reaction mixture is then stirred for 60 minutes. During the addition of the aqueous nickel chloride solution, the potential of the reaction mixture is measured constantly with a platinum double-ring electrode, while applying a constant current of 5 μA between the platinum rings. Then the aqueous nickel chloride is added in increments of 1 part at 5 minute intervals. The addition is complete when there is a marked jump in the potential upon addition of the aqueous nickel chloride solution and no further recoil of the potential is observed. The 1:1 nickel complex dye is isolated by filtration.

EXAMPLE 8

A mixture of 59.2 parts of the dye of formula

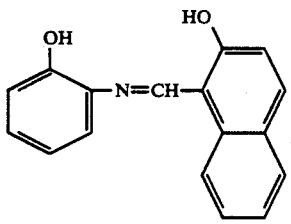
(109)

and 940 parts of water are heated to a temperature of 85° C. Then 1000 parts of a previously prepared aqueous solution of copper sulfate/ammonia (prepared by dissolving 58 parts of copper sulfate and 49 parts of concentrated ammonia (30%) in 1200 parts of water) are added continuously to the mixture over 15 minutes. During the addition of the copper sulfate/ammonia solution, the potential of the reaction mixture is measured constantly with a platinum double-ring electrode, while applying a constant current of 5 μA between the platinum rings. After 30 minutes the aqueous copper sulfate/ammonia solution is added in increments of 10 parts at 10 minute intervals. The addition is complete when, after changes in the potential induced by the addition of the copper sulfate/ammonia solution, virtually no recoil of the potential is observed. The 1:1 copper complex dye is isolated by filtration.

What is claimed is:

1. A process for the preparation of a metal complex dye under production conditions, which comprises reacting at least one dye with a metal donor, adding said metal donor or said dye discontinuously before the end point of the metallising is reached, and determining the end of the metallising voltametrically.

2. A process according to claim 1, wherein the dyes are selected from the group consisting of monoazo, disazo and polyazo dyes and azomethines, preferably monoazo dyes.

3. A process according to claim 1, wherein the metal donor is a cobalt, nickel or copper donor, preferably a cobalt donor.

4. A process according to claim 1, wherein the reaction is carried out in the presence of an oxidising agent.

5. A process according to claim 4, wherein air is blown into the reaction mixture in the course of the reaction.

6. A process according to claim 1, wherein the volatametric determination is carried out using two polarisable electrodes without a reference electrode.

7. A process according to claim 6, wherein the polarisable electrodes are double-ring electrodes, preferably platinum double-ring electrodes or gold-plated platinum double-ring electrodes.

8. A process according to claim 1, which comprises carrying out the reaction of the dye with the metal donor by a fully automated process in which the addition of the dye or metal donor is controlled by a voltametrically determined measured variable 9. A process according to claim 1, which comprises charging the dye to the reactor and adding the metal donor thereto.

10. A process according to claim 1, which comprises carrying out the reaction of the dye with the metal donor in a concentrated solution or, preferably, in a suspension.

11. A process according to claim 10, which comprises carrying out the reaction of the dye with the metal donor in a concentrated aqueous solution or, preferably, in an aqueous suspension.

12. A process according to claim 1, which comprises carrying out the reaction of the dye with the metal donor to give the metal complex dye continuously after the synthesis of the dye.

13. A process according to claim 1, which comprises carrying out the reaction of the dye with the metal donor to give the metal complex dye continuously after the synthesis of the dye, adding the metal donor and charging the dye to the reactor, and using as electrodes two polarisable electrodes without reference electrode.

* * * * *